Nov. 30, 1954     P. HEFTLER     2,695,791
AUTOMOBILE SPRING SUSPENSION
Filed May 26, 1949

INVENTOR.
Paul Heftler

United States Patent Office 2,695,791
Patented Nov. 30, 1954

2,695,791
AUTOMOBILE SPRING SUSPENSION

Paul Heftler, Windsor, Ontario, Canada, assignor to Victor Heron, Riverside, Ontario, Canada, as trustee Application May 26, 1949, Serial No. 95,529

2 Claims. (Cl. 280—124)

This invention is a spring suspension for automobiles, that is, a linkage for guiding the wheels of an automobile relative to the frame as they move up and down in response to irregularities in the road. The principal object of this invention is to provide a spring suspension which is "independent" and is at the same time extremely simple. By "independent," one means that the suspension is such that each wheel can move independently of the other as contrasted to a suspension with an axle, in which the raising or lowering of one wheel relative to the other causes the other wheel to tip out or in. Another object of this invention is to provide an independent spring suspension that is extremely simple and yet includes an anti-sway bar or spring to oppose the rolling of the car about a longitudinal axis, as under the influence of centrifugal force when making sharp turns.

Figure 1:
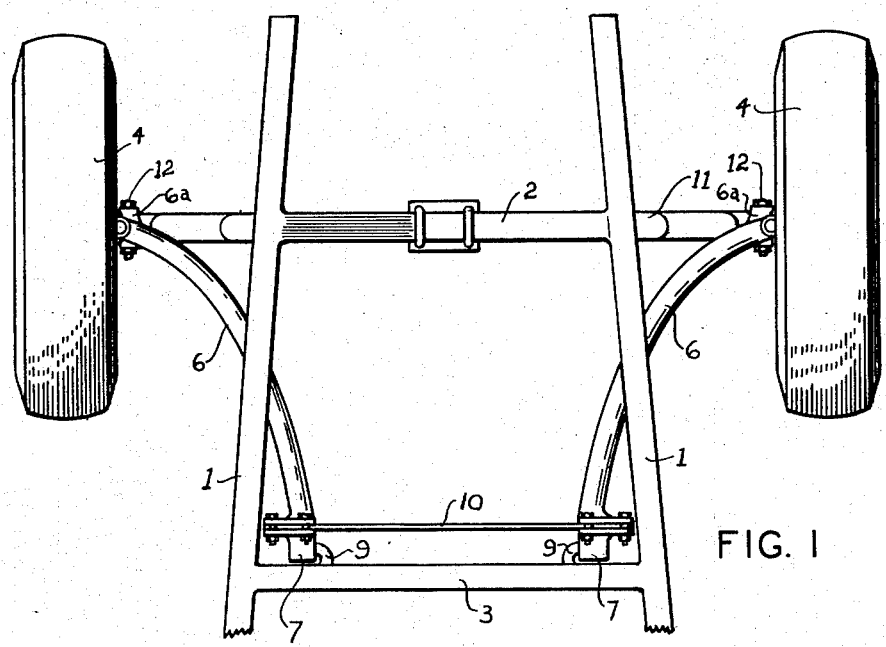
Figure 2:
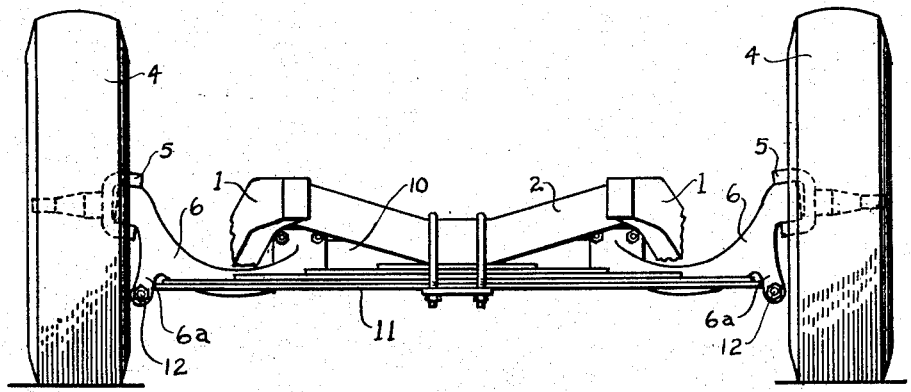
Figure 3:
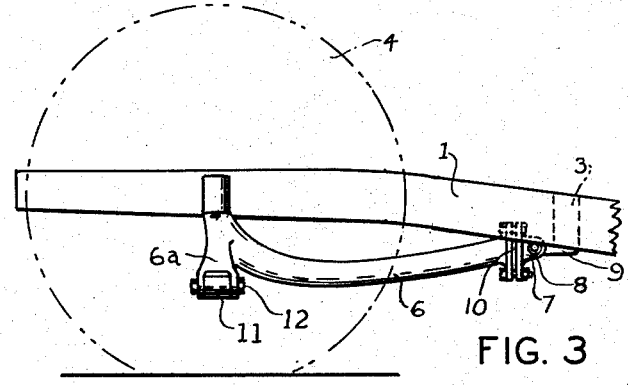

How these objects have been attained may be seen from the following description and the accompanying drawing, in which:

Fig. 1 is a plan view of one form of the invention;
Fig. 2 is a front view of the same form of the invention; and
Fig. 3 is a side view, with many of the parts omitted so that the others can be seen more clearly.

The invention is shown mounted upon a conventional automobile frame, which includes side rails 1, a front cross member 2, and a second cross member 3. The frame is shown broken off just in back of the second cross member 3, since that is all that is needed to illustrate the invention.

Each of the two front wheels 4 is carried on a steering knuckle 5 that is pivoted on the forward end of a longitudinal swinging arm 6. The rear end of each arm 6 has a bracket 7 fixed to it, and each bracket 7 is pivoted with a rubber bushing 8 to a bracket 9 fixed to the second cross member 3 of the frame.

The two swinging arms 6 are connected together at their rear ends by a flat piece of spring steel 10, whose ends are firmly fixed to the ends of the arms by being clamped there by the brackets 7. The spring 10 lies in a vertical plane extending across the car, so it prevents either of the two arms 6 from turning about an axis extending lengthwise of the car. However, by bending slightly in a horizontal plane, the spring 10 permits the arms 6 to swing sideways a little, and, by twisting, it permits either of the arms to swing up or down relative to the other. Swinging of both arms 6 up or down together takes place without any twisting of the spring 10.

The arms 6 are held against swinging sideways and are pressed down by a simple transverse leaf spring 11 fixed at its center to the underside of the front cross member 2 of the frame. The ends of the spring 11 are pivoted (not shackled) to extensions 6a of the longitudinal swinging arms 6, which are provided to put the pivots 12 as low and as close to the planes of the wheels as practical. These pivots also can have rubber bushings, and rubber pads can be used under the tips of the spring leaves, so that there is nothing in the front suspension (outside of the wheel bearings and the steering pivots) that needs to be oiled or greased.

The extreme simplicity of this independent suspension can be measured by the fact that in the suspension proper, not counting the steering knuckles and other steering pivots, there are only four pivots, even though the suspension includes an anti-sway bar. The conventional double wishbone independent suspension with an anti-sway bar has sixteen to twenty pivots, depending chiefly on how the anti-sway bar is installed, and the well-known simple non-independent suspension shown in the Henry Ford Patent No. 1,044,038, with no anti-sway bar and no cross-link to prevent steering wander, had five pivots.

The extreme simplicity of this suspension is achieved by making the springs serve multiple purposes. The load-carrying spring 11 not only presses the wheels down relative to the frame, but it also functions as two links holding the two wheels at the right distances out from the frame. The anti-sway spring 10 not only opposes rolling of the car, but it also acts like at least two links to keep the wheels upright.

The invention is, of course, not limited to the particular form shown in the drawing but includes any construction falling within the terms of the following claims.

I claim:

1. In an automobile, a frame, a pair of longitudinally extending arms, a pair of steering knuckles pvioted to the outer ends of the arms, a pair of wheels mounted on the steering knuckles, a pair of pivots connecting the inner ends of the arms to the frame, a flat torsion spring extending on edge crosswise of the automobile, fastening means fixing the ends of the torsion spring to the inner ends of the arms, a transverse leaf spring, fastening means fixing the center of the leaf spring to the frame, and a pair of pivots connecting the ends of the leaf spring to the outer ends of the arms, the two springs and their fastening means and the four pivots forming the entire means for guiding the arms relative to the frame.

2. In an automobile, a frame, a pair of laterally-spaced longitudinally-extending arms pivoted to the frame at their inner ends, a pair of wheels mounted on the outer ends of the arms, transverse spring and link means connecting the outer ends of the arms to the frame and pressing them down relative to the frame and holding them against swinging sideways relative to the frame, and a flat torsion spring fixed at its ends to the inner ends of the arms, a flat torsion spring lying in an upright plane and being strong and stiff enough against bending in that plane to keep the arms from turning about their own axes and to keep the wheels upright.

References Cited in the file of this patent

UNITED STATES PATENTS

| Number | Name | Date |
|---|---|---|
| 1,426,719 | Doyal et al. | Aug. 22, 1922 |
| 1,583,629 | Wagner | May 4, 1926 |
| 1,648,505 | Persu | Nov. 8, 1927 |
| 1,798,077 | Garner | Mar. 24, 1931 |
| 1,803,055 | Causan | Apr. 28, 1931 |
| 1,886,940 | Causan | Nov. 8, 1932 |
| 2,033,493 | Straussler | Mar. 10, 1936 |
| 2,060,015 | Barnes et al. | Nov. 10, 1936 |
| 2,105,541 | Leighton | Jan. 18, 1938 |
| 2,138,438 | Wagner | Nov. 29, 1938 |
| 2,144,112 | Ingildsen | Jan. 17, 1939 |
| 2,164,602 | Valletta | July 4, 1939 |
| 2,202,810 | Blanc | June 4, 1940 |
| 2,206,970 | Megow | July 9, 1940 |
| 2,361,924 | Boynton | Nov. 7, 1944 |
| 2,420,462 | Carr | May 13, 1947 |